United States Patent [19]

Tisma

[11] Patent Number: 4,829,751
[45] Date of Patent: May 16, 1989

[54] APPARATUS WITH REPLACEABLE TRAYS ON AUTOMATIC PACKAGING MACHINES

[75] Inventor: Steven Tisma, Chicago, Ill.

[73] Assignee: Tisma Machine Corporation, Chicago, Ill.

[21] Appl. No.: 115,439

[22] Filed: Oct. 30, 1987

Related U.S. Application Data

[63] Continuation-in-part of Ser. No. 905,708, Sep. 9, 1986, Pat. No. 4,716,714.

[51] Int. Cl.⁴ .................... B65B 35/24; B65B 39/14
[52] U.S. Cl. ..................................... 53/575; 53/252; 198/803.01; 198/803.2
[58] Field of Search ............... 53/251, 252, 260, 575, 53/579; 198/365, 802, 803.01, 803.2

[56] References Cited

U.S. PATENT DOCUMENTS

| | | | |
|---|---|---|---|
| 3,509,681 | 5/1970 | Sass ........................................ | 53/252 |
| 3,587,829 | 6/1971 | Sorensen ........................ | 198/803.01 |
| 3,610,407 | 10/1971 | Prodzenski ..................... | 198/803.01 |
| 4,219,989 | 9/1980 | Andrews ........................... | 53/260 X |
| 4,509,309 | 4/1985 | Langen ............................. | 53/252 X |
| 4,578,929 | 4/1986 | Tisma ............................... | 53/251 X |

*Primary Examiner*—John Sipos
*Attorney, Agent, or Firm*—Laff, Whitesel, Conte & Saret

[57] ABSTRACT

An automobile packaging machine having a conveyor which travels over a fixed and closed path. A plurality of carriers are mounted at fixed intervals along the conveyor. A tray having a fixed physical dimensions, is mounted on the carrier to carry an object having the same dimensions. The tray is releasably locked onto the carrier by a detent and a set screw associated with interconnectors. A spring biased detent indexes the position of said tray on said carrier. Then, a set screw is tightened to lock the tray in place. This way trays may be changed quickly and easily.

8 Claims, 5 Drawing Sheets

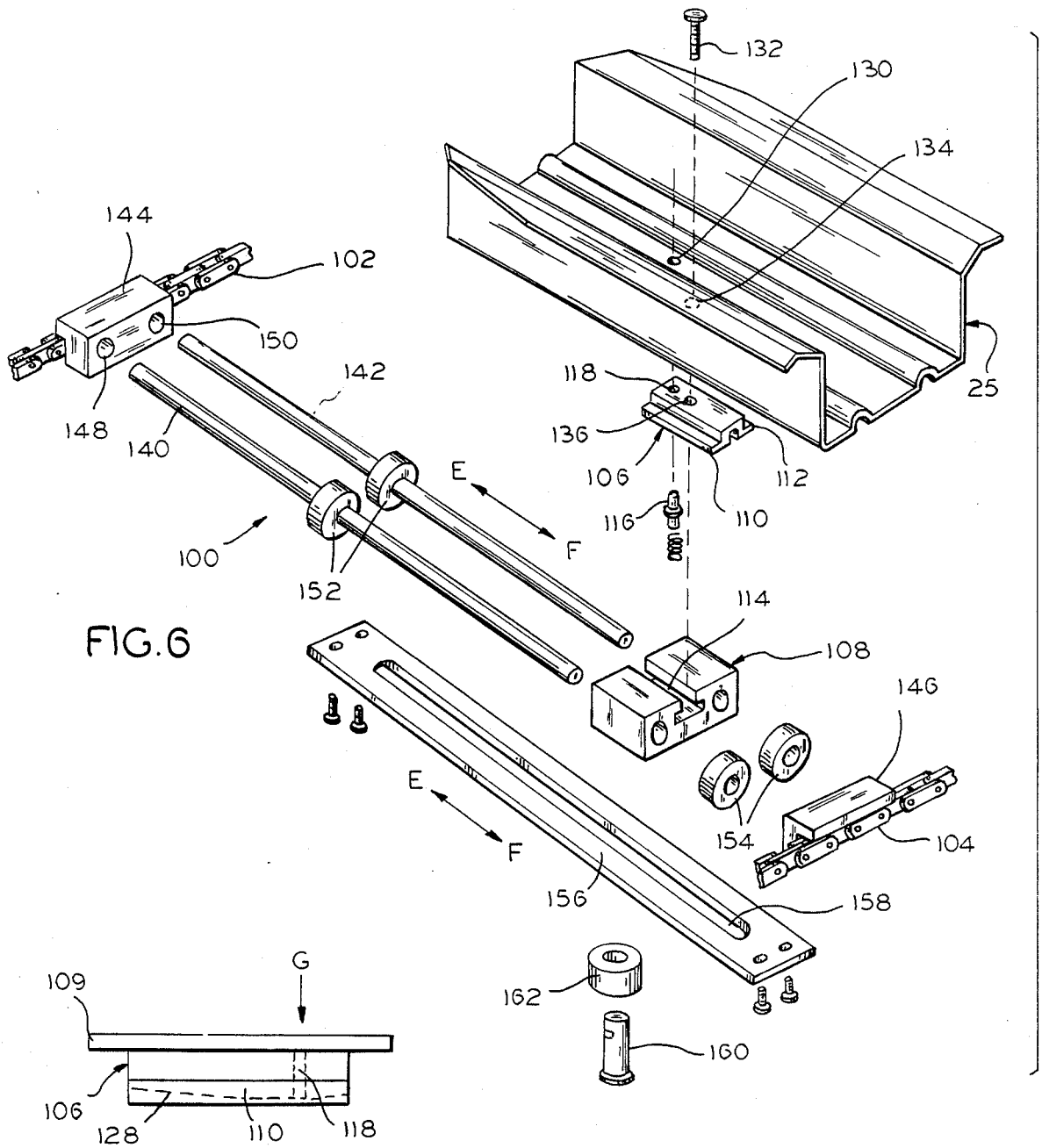
FIG.6
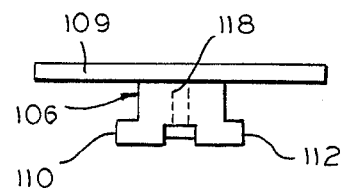
FIG.8
FIG.9
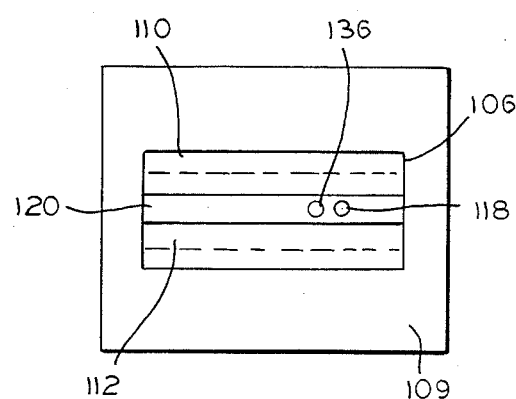
FIG.7

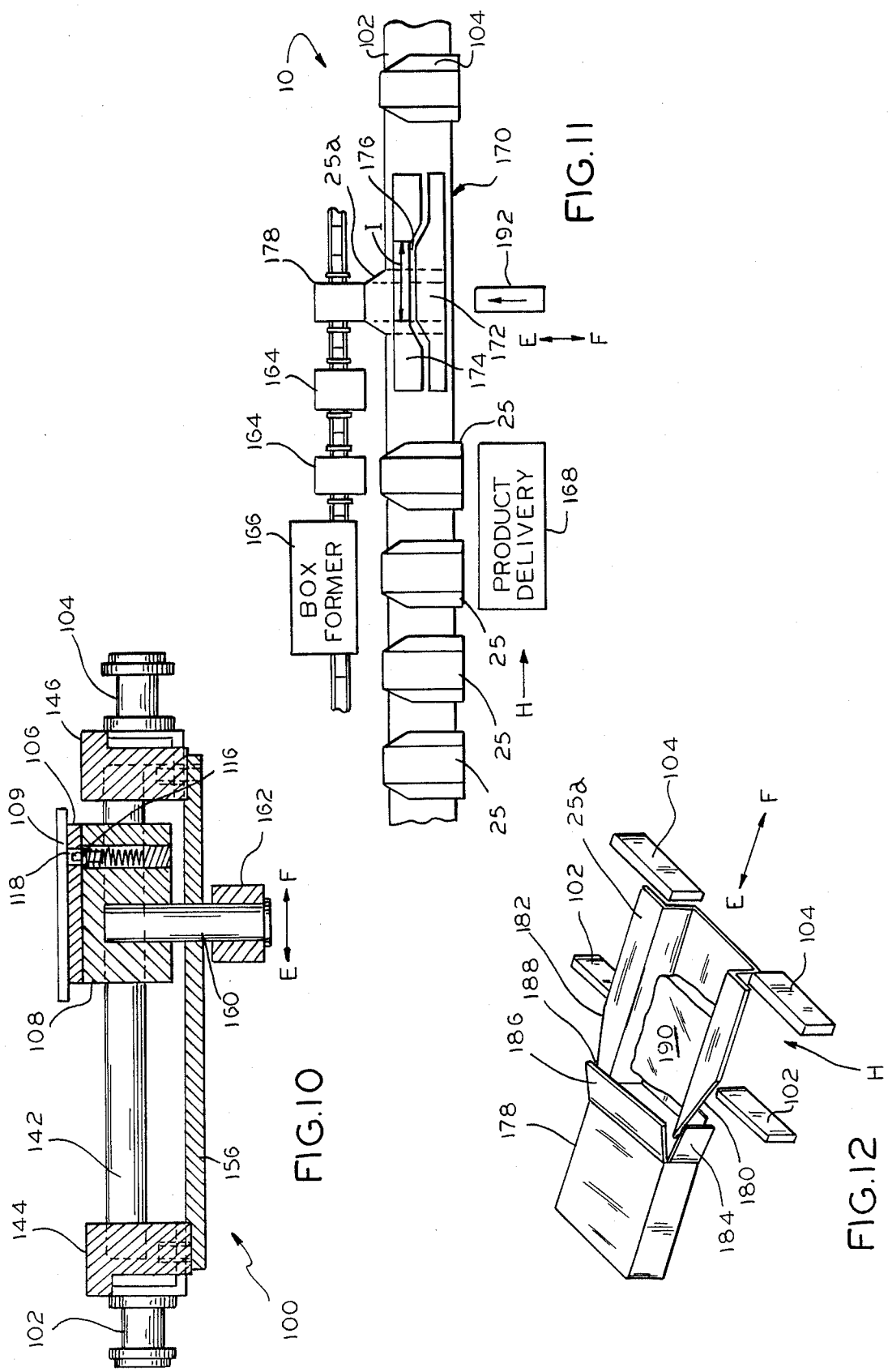

APPARATUS WITH REPLACEABLE TRAYS ON AUTOMATIC PACKAGING MACHINES

This is a continuation-in-part of Ser. No. 06/905,708 filed Sept. 9, 1986, now patent No. 4,716,714.

This invention relates to apparatus providing for easily replaceable trays and more particularly to replaceable trays used on automatic packaging machines.

One known example of an automatic packaging machine is found in U.S. Pat. No. 4,578,929. Heretofore, this type of machine has been maintained by a crew of men who would repair or replace parts, change or adapt machines to set up a new production run, or the like. With the advent of microprocessors and similar control devices, these packaging machines are being redesigned to operate as unattended robots. As the machines become more self-sufficient, the number of repair men and operators is sharply reduced. The skill level of those who remain is greatly increased since they have become computer operators and service men. Then, the cost of repair and replacement becomes more expensive because there are fewer people to make the repairs and those who remain not only command higher salaries and wages but also may have a lower skill level in mechanical matters. Therefore, it is desirable to eliminate those parts which require frequent maintenance.

These machines form and fill boxes which might hold almost any product, such as a finely divided product, which could be dry rice, peanut, or the like, or a single product, which could be a pouch of food to be frozen. Either the boxes or the product may be held tightly in and moved by trays during the filling process. Since there are many different sizes, shapes, and styles of boxes or products, it is usual for the trays to be changed each time that a different box or product is used. In the past it has been an inconvenient and time consuming work to change the trays. Also, the packaging machine is out of service during the change over of trays, which means a loss of output and revenue. Moreover, it may not always be possible to fill the boxes with products through the same type of feeding arrangement. For example some boxes are filled from the top, while others are filled horizontally. Sometimes the box is in the loading station and the product is brought to it. Other times the product is in the loading station and the box is brought to it. Therefore, it may be necessary to move the positions of the trays as they travel from station to station. All of these considerations complicate the maintenance of the machine.

By way of example, U.S. Pat. No. 4,578,929 shows an automatic packaging machine for forming cardboard blanks into boxes. A mandrel holds and moves the blank while it is being formed into a box and then moves it past filling and sealing stations to an output area. A plurality of these mandrels are attached to and moved by conveyor chains which are usually in the form of a relatively large link or bicycle chain. When it is desirable to change the shape or size of a box, it has been necessary to unbolt and remove all of these mandrels, and then to replace them with new mandrels of a different size or shape. This is a very time consuming task.

U.S. Pat. No. 4,578,929 shows only a mandrel for holding a top fill box, but other boxes may be filled horizontally, through a side or end panel. Also, a mandrel may hold the product which is brought to a box. The mandrel may be rotated between different radially oriented position as shown in the patent, and may be moved horizontally toward and away from a fill station. The patent does not disclose details about either bringing the product to this box or such lateral motion for horizontal loading. Nevertheless, it should be apparent that a substantial amount of man-hours would be consumed in changing a mandrel or tray especially on complicated mechanisms which make them horizontally movable. Thus, there is a need for an easy-operating apparatus, for replaceable mandrels or trays and, at the same time, enabling the trays to move both longitudinally along a conveyor and laterally into and out of a fill position.

Accordingly, an object of this invention is to provide apparatus with easily replaceable trays. A more particular object is to provide apparatus which enamels the trays to be changed easily and quickly by service men having little or no special training.

Yet another object of this invention is to provide an automatic packaging apparatus having trays which are laterally movable in order for the boxes to be filled.

In keeping with one aspect of the invention, these and other objects are accomplished by a mandrel and a tray combination which has interconnectors, one on the bottom of the tray and the other on a conveyor, such as a link chain. A spring loaded detent on one of the interconnectors fixes its position relative to the other of the interconnectors as they slide together and into a locked position where a set screw is tightened to hold it in position. Replacement of the tray is accomplished by loosening the set screw, pushing down upon the spring loaded detent, and sliding the tray until the interconnectors are released.

The invention will be best understood by reference to the following description of an embodiment of the invention shown in the attached drawings, in which.

Figure 3:
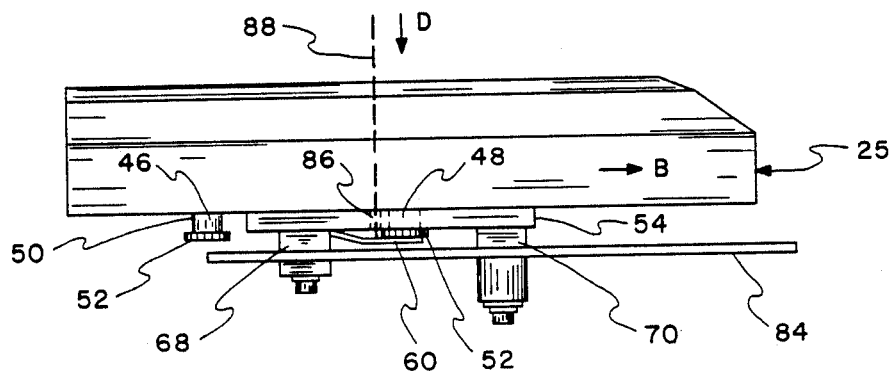
Figure 4:
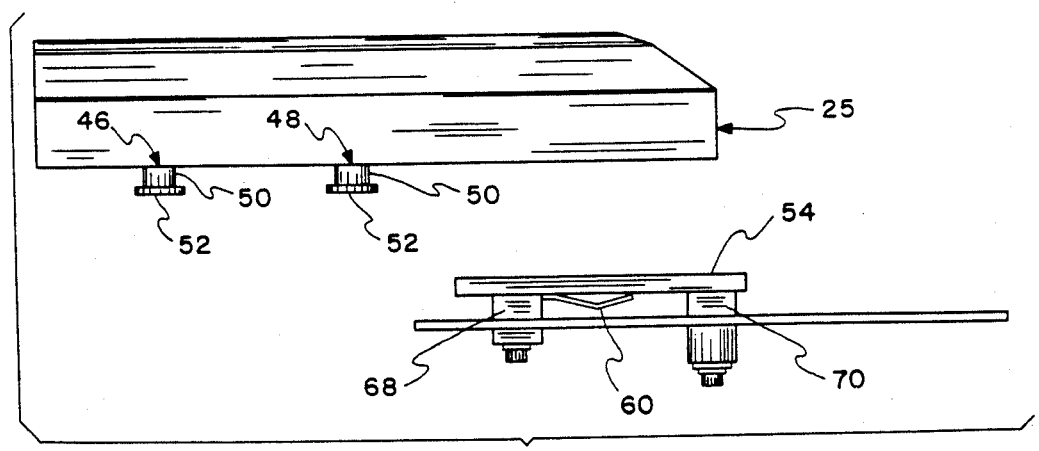
Figure 5:
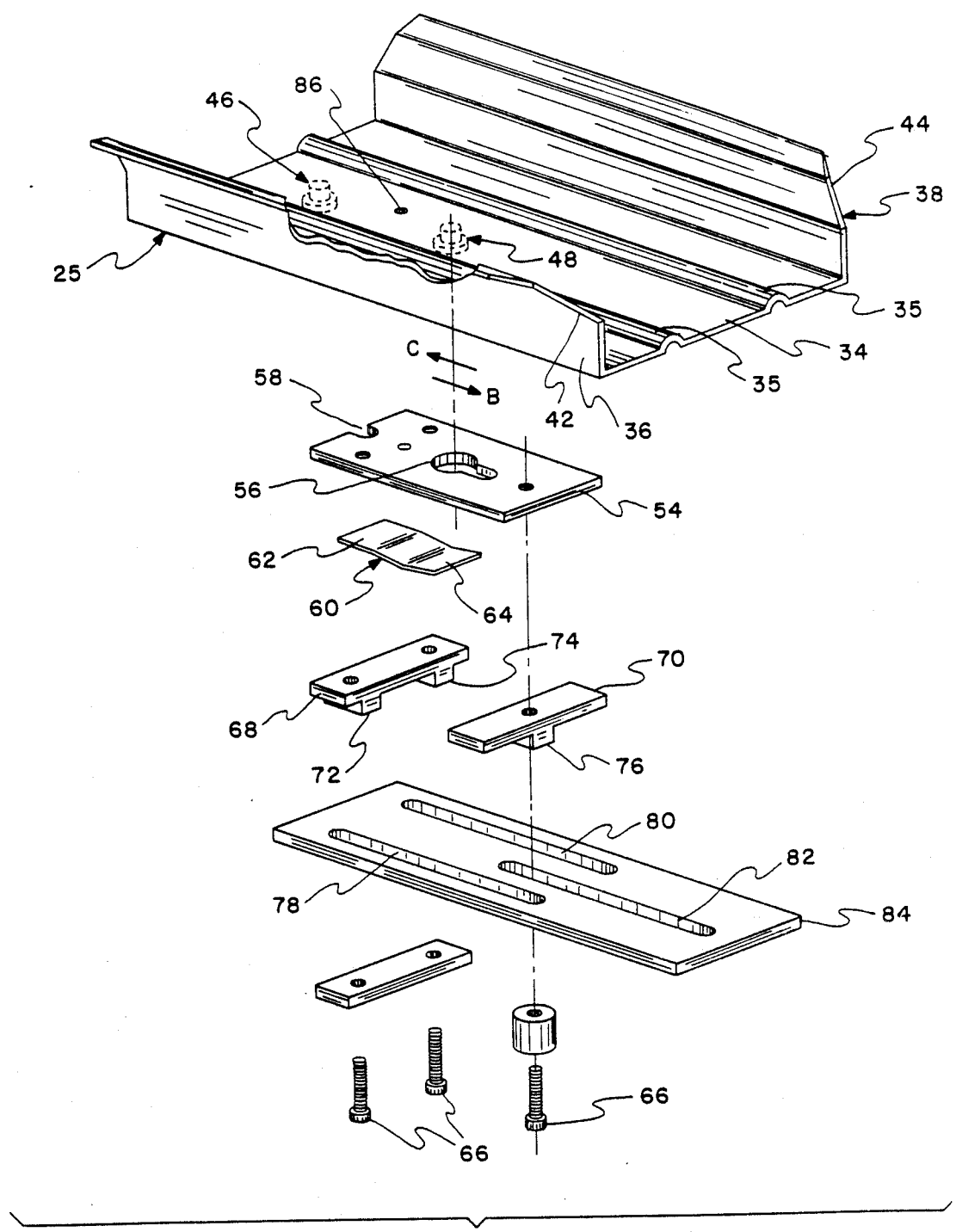

FIG. 3 schematically shows the tray and the carriage in an initial, partial disengagement position;

FIG. 4 is a side elevation which shows the tray and carriage completely disengaged from each other;

FIG. 5 is an exploded view of the tray and carriage;

FIG. 6 is an exploded view, in perspective, of a second embodiment of the invention;

FIGS. 7-9 are top, side and end views respectively of an interconnector which is attached to the bottom of a tray;

FIG. 10 is a cross sectional view of a conveyor carriage, and interconnectors;

FIG. 11 schematically illustrates how the inventive tray is thrust forward to load a box; and FIG. 12 is a perspective view of a product being loaded into a box.

Figure 1:
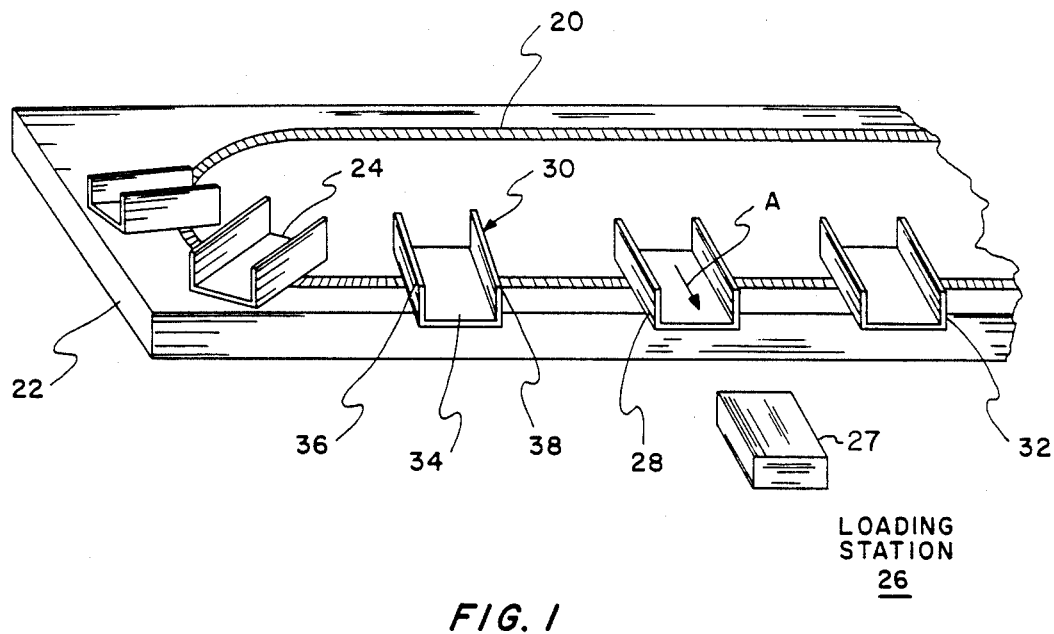
FIG. 1 is a fragment of a conveyor and loading station schematically showing a first embodiment of the inventive tray.
Figure 1A:
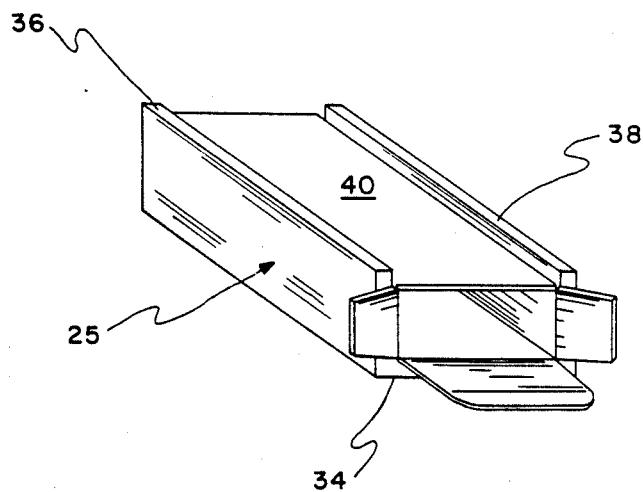
FIG. 1A is a perspective view of a mandrel tray folding an exemplary box or product, as the case may be.

Briefly, FIG. 1 shows a conveyor chain 20 mounted on any suitable support table 22. The conveyor chain 20 may be any suitable link or bicycle chain which moves over a fixed path and which carries mandrels 24. Each mandrel (FIG. 1A) has a movable tray 25 which holds a box or a product and a carriage which is connected to the conveyor chain to carry the tray. While FIG. 1 shows only a few mandrels it should be understood that any suitable number of mandrels may be provided.

As the conveyor chain 20 (FIG. 1) moves the mandrels 24 around the path, they may pass one or more work stations, which are collectively and generically represented by loading station 26. The loading station includes item 27 which might be either an empty box waiting for a product or a product waiting to be inserted into an empty box. As the mandrel reaches the loading station 26, the mandrel tray 28 is thrust forward to a loading position as indicated by the arrow A. At both the preceding position 30 and the succeeding position 32 the tray is withdrawn to a non-loading position. Of course, there may be other places and positions along the path of the conveyor chain 20 where the trays may be thrust forward or withdrawn.

Each of the trays 25 (FIG. 1A) has a floor 34 and two spaced parallel, upstanding flanges 36, 38 which receive and embrace the box or product 40 which is to be filled or to fill a box. It should be apparent that each tray is dedicated to the task of carrying a box or product having only one set of specific physical dimensions. Therefore, it is necessary to change trays every time that a box or product with new and different dimensions is to be filled. Heretofore, it has been common practice for a crew of service men to unbolt each mandrel and to remove it from the conveyor chain. Then, other mandrels having the physical dimensions of the new box are bolted onto the conveyor chain. This set-up process may consume hours.

According to the invention, means are provided for quickly and easily replacing the trays, by the use of the tray and carrier shown in FIGS. 2–5.

Figure 2:
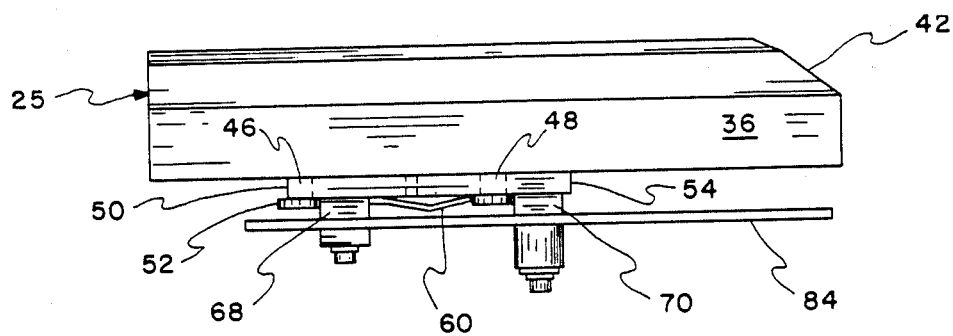
FIG. 2 is a side elevation view which shows the inventive mandrel with a tray and carriage which are coupled together.

As best seen in FIG. 5, the tray 25 has a floor 34 which is corrugated at 35 for added strength. The upstanding flanges 36, 38 have tapered corners 42, 44 which facilitate an insertion into an empty box or a filling device during a loading procedure. Dependant from the bottom 34 of the tray 25 are two inverted bolt-like interconnecting members 46, 48. Each of these bolt-like members comprises a shank 50 and a head 52 (FIGS. 2–4). The length of the shank 50 corresponds to the thickness of a support plate 54.

The support plate 54 contains a key hole slot 56 (FIG. 5) and a locking slot 58 which are separated by a distance corresponding to the distance between the bolt-like interconnecting members 46, 48. Therefore, when the head 52 on the interconnecting member 48 is fitted through the large part of the key hole 56, the tray may slide in direction B. The shanks 50, 50 slide into the small part of the key hole 56 and into the end locking slot 58. At the end of the slide in direction B, the tray 25 is firmly fixed in position on the plate 54.

A leaf spring 60 has an end 62 which is fixed onto the bottom of the plate 54, the opposite end 64 of the leaf spring being free to flex as the head 52 of the interconnector 48 passes between plate 54 and the spring. After the head 52 emerges from under the end 64, leaf spring 60 snaps down to lock the tray in place. Thereafter, the tray 34 can not move back in direction C, unless the end 64 of leaf spring 60 is first pushed down far enough to enable the interconnector head 52 to pass over it.

Bolts 66 attach guide plates 68, 70 to the bottom of support plate 54. Depending from guide plates 68, 70 are spaced parallel flanges which fit into and slide along guide ways in the form of slots 78, 80, 82 in a carriage plate 84.

It should now be clear how the tray 25 may be moved along the length of the carriage plate 84, with the flanges 72, 74, 76 sliding back and forth in the guide way slots 78, 80, 82. This way the tray 25 may be in the withdrawn positions 30, 32 (FIG. 1) or in the extended position 28. The equipment for actually moving the tray between these two positions is irrelevant. Often, it is moved by plows mounted along the path followed by conveyor chain 20.

A hole 86 is formed in the bottom of the tray 25, at the point which is immediately above the leaf spring 60. Therefore, when a pin, indicated by dashed line 88 (FIG. 4), is pressed down (direction D) through the hole 86, end 64 of the leaf spring 60 is pressed downwardly far enough to enable the head 52 of the interconnector 48 to pass over it. As seen in FIG. 3, the tray 25 has moved about half-way from the locked to this unlocked position, the head 52 of interconnector 48 passing between leaf spring 60 and support plate 54. When the bolt-like interconnector 48 reaches the enlarged end of the key hole 56, the head 52 escapes from support plate 54 and tray 25 separates therefrom.

Thereafter a different tray 25, with physical dimensions which are adapted to hold the next box or product which is to be carried, is attached to the support plate 54 by having its bolt-like interconnector fitted through the key hole 56 and slid forward into the locking position (FIG. 2).

Thus, it is seen that the trays may be removed and replaced quickly and easily without disturbing the connection between
the carriage plate 84 and the conveyor chain 20.

A second embodiment of the invention is shown in FIGS. 6–11. In greater detail, the tray 25 is coupled to a carriage assembly 100 (FIGS. 6, 10) which, in turn, is attached to and moves with two link chains 102, 104. The tray 25 and carriage 100 are interconnected by two slidably engaging interconnector parts 106, 108. Interconnector part 106 has a plate 109 (FIG. 9) which is welded to the bottom of tray 25. A sliding transport block or interconnector part 108 is mounted on carriage 100 to slide back and forth in directions E, F.

The interconnector part 106 (FIGS. 7–9) has an opposing two outstanding flanges 110, 112 to give a somewhat inverted "T" shaped cross section. A slot 114 has a cross section which is complementary to the cross section of part 106, in order to slidably receive the inverted "T" shape. A spring loaded detent 116 is mounted in a hole formed in the sliding block or interconnector part 108. An indexing hole 118 is formed in interconnector part 106 to receive the detent. As best seen in FIGS. 7–9, a guide way 120 is formed in part 106 to guide and direct the detent 116 into the indexing hole 118. The bottom surface 128 (FIG. 8) of this guide way 120 is inclined upwardly to admit and then raise the detent 116 to a point where it may drop into the hole 118.

If a pin is inserted through a hole 130 (FIG. 6) in the bottom of the tray 25, through the indexing hole 118 (FIG. 8), and pushed in direction G, the detent 116 is pushed out of the indexing hole 118 to release the interconnector parts 106, 108, which may then slide apart.

After the spring loaded detent 116 is positioned within the indexing hole 118, a locking set screw 132 (FIG. 6) is fitted through hole 134 in the bottom of tray 25, through a threaded hole 136 in interconnector part 106 and against sliding transport block or interconnector part 108 to lock the two interconnectors in place.

This screw must be loosened before the interconnectors may be separated.

Interconnector part or sliding transport block 108 is mounted for reciprocal movement on carriage 100, which in turn is carried by link chains 102, 104. In greater detail, a spaced parallel pair of rods 140, 142 are mounted in end mounting rail blocks 144, 146, which are attached to chains 102, 104. The diameter of rods 140, 142 is slightly less than the diameter of holes 148, 150 in rail blocks 144, 146. The resulting play is enough to prevent binding of the sliding block 10 if there is a slight misalignment, without introducing an excessive looseness. Sliding bushings 152, 154 insures a smooth sliding action.

The end mounting rail blocks 144, 146 are attached to the ends of a tie plate 156. An elongated slot 158 is formed in the center of the tie plate 156 to receive and guide roller pin 160 that is fastened into the bottom of sliding block or interconnector part 108. A cam follower in the form of roller 162 is rotatably mounted on roller pin 160. Therefore, as the block 108 slides, roller 162 is driven back and forth in directions E, F. The pin 160 and, therefore, cam following roller 162 moves along slot 158, also in directions E, F.

The operation of the system using the inventive tray is explained in FIGS. 11, 12. A plurality of mandrels are attached to link chains 102, 104 to carry trays 25 in direction H. In another conveyor line, a plurality of boxes 164 are carried in alignment and synchronism with the trays 25 so that each box confronts the end of a corresponding tray. Each box is formed and placed in the line by any suitable means, 166, which is known in the art.

Still another conveyor line or other known delivery system is provided as generally indicated at 168 for depositing product in trays 25. Details about the product and the delivery system 168 is irrelevant to the invention except insofar as it may require different types of boxes 164, which may, in turn, require a switching of tray types. For example, a pouch of food to be frozen requires a box of one shape; a pound of butter might require a box of another shape. This in turn, requires trays 25 to be changed to accommodate the different shapes.

In the area 168, any suitable means deposits one product in each tray 25. In the area 170, a pair of cam plates 172, 174 define a guide way 176, between them. The cam roller 162 (FIGS. 6, 10) passes through the guide way 176 which thrusts the tray 25a forward, as slide block or interconnector part 108 moves in direction E (FIG. 12).

The front of tray 25a has two plow like edge surfaces 180, 182 which are thrust into the box 178 to spread the end flaps 184, 186, 188 on the box 178. The product 190 in the tray 25a is thrust into the box 178 by any suitable pusher mechanism 192 (FIG. 11).

The box 178 and tray 25a (FIG. 11) are traveling together in direction H and over the distance I while the product is being loaded into box 178. The pusher 192 has also moved forward (direction E) and retracted (direction F) during this movement over distance I. Therefore, when the tray reaches the end of distance I, the guideway 176 provided by cam plates 172, 174 causes the cam following roller 162 to withdraw the tray 25a from the box 178.

Those who are skilled in the art will readily perceive how to modify the system. Therefore, the appended claims are to be construed to cover all equivalent structures which fall within the true scope and spirit of the invention.

The invention which is claimed is:

1. A mandrel for an automatic packaging machine, said mandrel comprising a carriage assembly having guide rods for enabling a limited longitudinal motion, a sliding block transport mounted on said guide rods for enabling movement of said mandrel along said guide rods, a tray having physical dimensions corresponding the physical dimensions of an object to be carried by said tray, interconnector means for attaching, detaching, and slidably joining said tray and said sliding transport block, detent means mounted in said sliding block for engaging said interconnector means for locking said tray to said sliding transport block at the end of the slide during said joining, and means formed in said tray for enabling a movement of said detent to unlock said tray from said sliding transport block so that said mandrels may be installed removed, and replaced merely by moving said detent and sliding said interconnector means.

2. The mandrel of claim 1 wherein said trays are associated with a cam follower which moves through a guide way on said packaging machine to thrust said tray forward and to retract said tray.

3. The mandrel of claim 2 wherein said tray has means for enabling said detent to be depressed in order to unlock said tray from said sliding block and means for receiving to securely lock said interconnector means.

4. The mandrel of claim 3 wherein said detent is spring biased to snap into a catch and said means for enabling a movement of said detent is a hole in said tray which is located at a point immediately over said detent to enable said detent to be moved by a pin passing through said hold.

5. An automatic packaging machine comprising a conveyor means mounted to travel over a fixed and closed path, a plurality of carrier means mounted at fixed intervals along said conveyor means to be carried over said closed path by said conveyor means, each of said carrier means including at least one slide rod carrying a slide transport block for enabling said block to be extended or retracted in a motion which is transverse to said conveyor, tray means mounted on said carrier means to carry objects which may have physical dimensions that may require a changing of trays, means for releasably interconnecting said tray means and said slide transport block responsive to a mutual movement of said tray and transport block relative to each other, and means mounted in said sliding block for engaging said interconnector means for releasably locking said tray onto said slide block at the end of said mutual movement in order to carry said physical objects, said releasable locking means comprising a spring biased detent indexing means and a set screw locking means.

6. The packaging machine of claim 5 wherein said slide rod has a diameter which is smaller than the diameter of a hole in which said rod is supported, whereby, there is enough play to prevent binding of said slide block on said rod.

7. The packaging machine of claim 5 wherein said interconnecting means comprises a first block having a part with an inverted "T" shape and a slot on said slide block having a cross section which is complementary to said "T" shape.

8. The packaging machine of claim 5 and a cam follower on the slide block and cam means associated with said conveyor block means for guiding said cam follower to slide said slide block along said slide rod.

* * * * *